United States Patent [19]
Ellis, Jr.

[11] 3,751,691
[45] Aug. 7, 1973

[54] ROTATIONAL TRANSDUCER USING HALL EFFECT DEVICES

[75] Inventor: Robert C. Ellis, Jr., Durham, N.C.

[73] Assignee: Sperry Rand Corporation, New York, N.Y.

[22] Filed: Apr. 14, 1972

[21] Appl. No.: 244,061

[52] U.S. Cl. .............................. 310/10, 310/DIG. 3
[51] Int. Cl. ........................................... H03b 15/00
[58] Field of Search ................................. 323/94 H; 310/DIG. 3, 10, 40

[56] References Cited
UNITED STATES PATENTS
3,309,642   3/1967   Grancoin .......................... 310/10 X
2,864,924   12/1958  Mayer ............................. 323/94 H X
3,194,990   7/1965   Kendall ........................... 310/DIG. 3 UX
3,541,361   10/1970  Nola ................................. 310/10

FOREIGN PATENTS OR APPLICATIONS
782,930     9/1957   Great Britain ................ 323/94 H X Primary Examiner—J. D. Miller
Assistant Examiner—Robert J. Hickey
Attorney—Howard P. Terry

[57] ABSTRACT

A brushless d.c. rotational transducer provides output voltages of low harmonic content. A diametrically magnetized rotatable shaft supplies flux for two magnetic stator members magnetically coupled to the shaft and disposed in space quadrature with respect to each other. A Hall effect device in each stator member is responsive to the instantaneous magnetic flux density in the stator member. The stator members are proportioned so that their pole arcs extend through an angle equivalent to the angle that would be occupied by an even number of half waves of the harmonic to be rejected. Tachometer and resolver embodiments of the invention are described.

10 Claims, 4 Drawing Figures

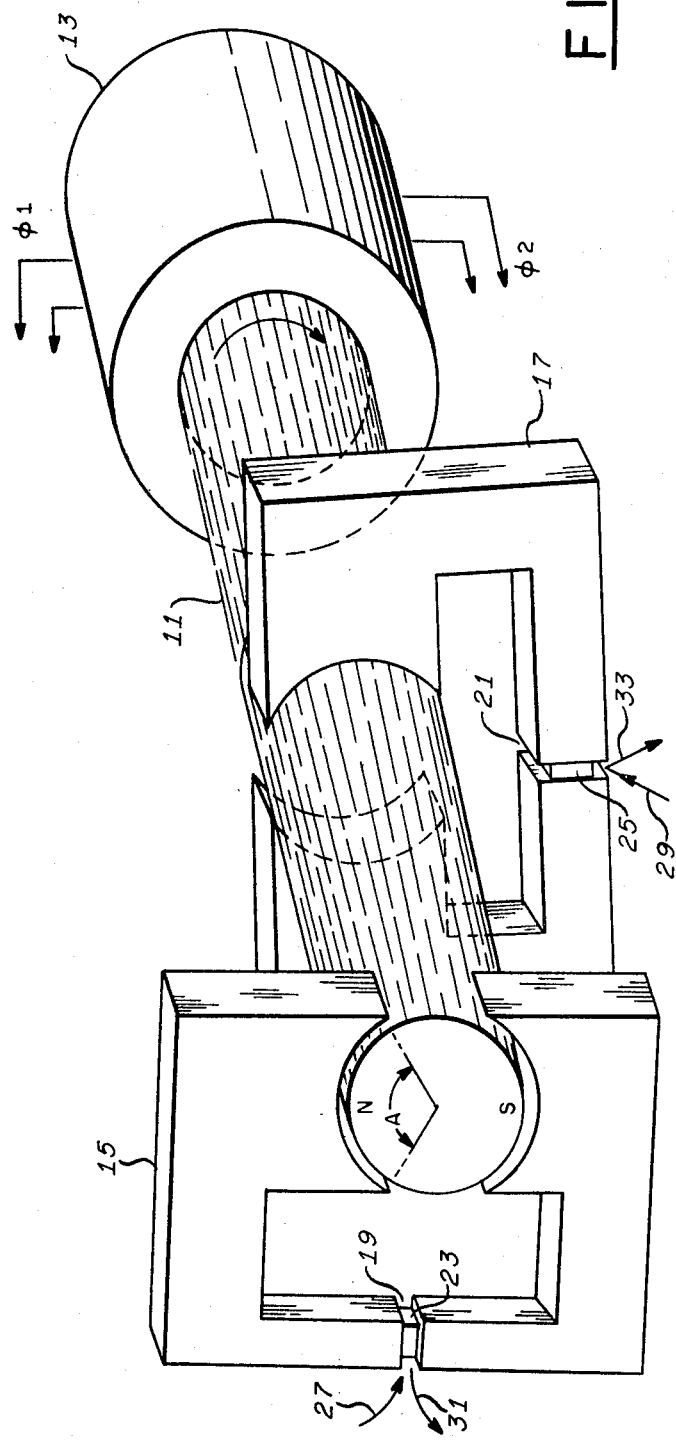
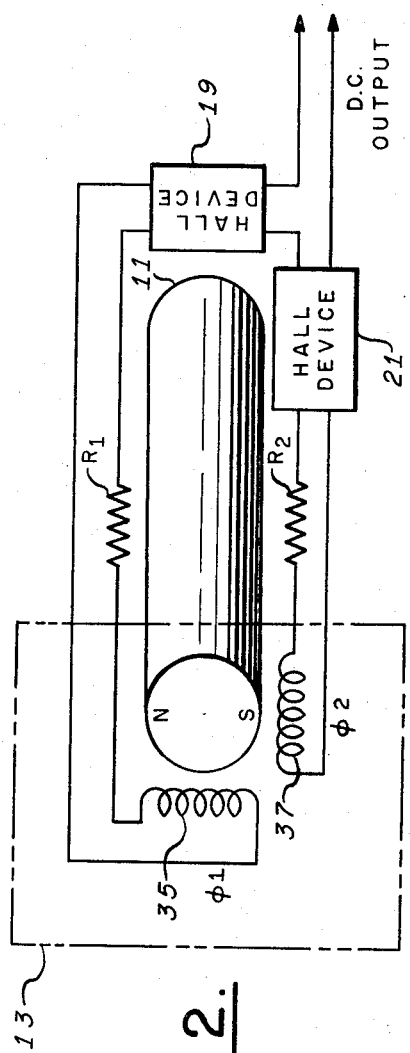
FIG.1.
FIG.2.

3,751,691

ROTATIONAL TRANSDUCER USING HALL EFFECT DEVICES

BACKGROUND OF THE INVENTION

1. Field of the Invention

The present invention relates to rotational transducers and more specifically to rotational transducers employing Hall effect sensors to detect angular displacement in a rotatable magnetized shaft.

2. Description of the Prior Art

Magnetic rotational transducers based on the principles of a brushless d.c. motor and employing Hall effect devices as magnetic field intensity sensors are known in the art.

Brushless d.c. tachometers have been built, for instance, in which a two-phase permanent magnet generator contains a diametrically magnetized rotor. Rotation of the magnetized rotor by externally applied torques generates a pair of voltages in time quadrature. An extension of the permanently magnetized rotor projects through an additional pair of magnetic stator elements disposed in space quadrature with each other. Magnetic flux is established in each of the stator elements in response to the magnetomotive force associated with the permanent magnetic field in the adjacent portion of the rotor. The magnitude of the flux in each stator element thus varies with the angular position of the rotor. A Hall effect device is positioned in each stator element so as to respond to the flux density in that stator. The control current for each Hall effect device is derived from the associated phase of the generator. The signal output of each Hall effect device is proportional to the product of the control current and the flux density. The output signals from the two Hall effect devices are added to produce a single output signal. If the flux density is a sinusoidal function of rotor rotation, the resulting single output signal is a d.c. voltage. However, in practical devices, the magnetic field in prior art devices deviates from a true sinusoid so that such prior art devices produce a significant ripple voltage.

SUMMARY OF THE INVENTION

The transducer of the present invention utilizes magnetic pole pieces having a pole arc equal to the pole pitch of a harmonic to be rejected so that the resultant flux in the magnetic pole at any time contain equal and opposite components of that harmonic.

BRIEF DESCRIPTION OF THE DRAWINGS

FIG. 1 is a view, partly in perspective, illustrating the functional relationship of various components in a tachometer employing the principles of the invention;

FIG. 2 is a schematic diagram illustrating a circuit useful with the tachometer of FIG. 1;

DESCRIPTION OF THE PREFERRED EMBODIMENTS

Figure 3:
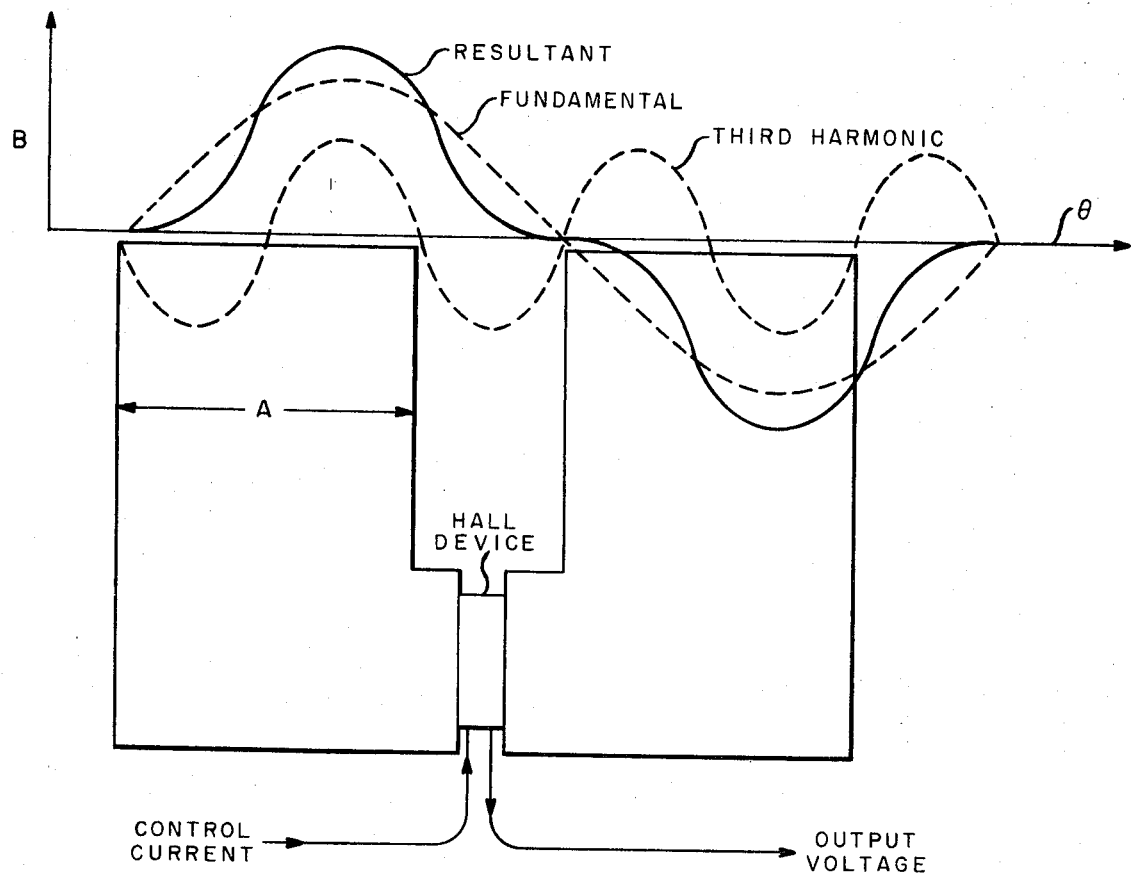
FIG. 3 is a diagram useful in explaining the principles of the invention.

The construction and organization of components in a tachometer employing the principles of the invention may be visualized by referring to FIG. 1. A rotatable shaft 11 whose speed is to be measured is driven by an external driving means (not shown). The shaft 11 is diametrically magnetized so as to produce north and south magnetic poles as indicated in the figure. A conventional two-phase generator 13 contains pairs of stator windings which cooperate with the magnetic field produced by the magnetized shaft so as to produce first and second quadrature phase voltages in response to rotation of the shaft 11. The generation of these phase voltages occurs in a conventional fashion. First and second magnetic core stator elements 15 and 17 are disposed in space quadrature with respect to each other. The pole pieces of the magnetic core elements are magnetically coupled to the shaft 11. The magnetic core elements 15 and 17 contain gaps 19 and 21 respectively, into which are inserted commercially available Hall effect devices 23 and 25. A control current is applied to the Hall effect device 19 through an input terminal 27 from one of the phases of the generator 13 whereas a control current is applied to the Hall effect device 25 through a control current input means 29 from the other phase of the generator 13. The corresponding output voltages are taken from the terminals 31 and 33, respectively.

The circuit connections of the tachometer of FIG. 1 may be understood by referring to the schematic diagram of FIG. 2. The shaft 11 is magnetically coupled to the stator coils 35 and 37 in the generator to provide phase one and phase two quadrature voltages respectively. The output voltage from the stator winding 35 is coupled to the Hall effect device 19 through a resistor $R_1$ representing the total circuit resistance in phase one. Similarly the voltage induced in stator winding 37 in phase two of the generator, is coupled to the Hall device 21 through the total series resistance $R_2$. The outputs of the Hall effect devices 19 and 21 are added so as to produce the final d.c. output voltage.

The output voltage of either of the Hall effect devices is proportional to the instantaneous magnitude of the control current and the instantaneous flux density. The instantaneous magnitude of the control current is dependent upon the characteristics of the generator 13. Since the flux density in either of these magnetic core elements arises from the magnetization of the shaft 11, the instantaneous flux density in that core element is dependent upon the intensity of the magnetization of the shaft 11, the instantaneous rotational position of the north-south axis of that shaft, and the pole arc A (FIG. 1) subtended by the poles of the magnetic core element.

The instantaneous phase voltages produced in phases 1 and 2 of the generator 13 are equal to the rotational speed of the shaft 11, the generator sensitivity and the sine and cosine, respectively, of the instantaneous rotational position of the north-south axis with respect to a selected reference line in accordance with well known principles. The magnitudes of the resulting control currents applied to the Hall effect devices are dependent upon the instantaneous voltage and the resistances $R_1$ and $R_2$ respectively.

The output of each Hall effect device is given by:

$$V_H = \gamma B \times I_c$$

where $V_H$ is the output voltage of the device, $\gamma$ is the sensitivity constant of the device, and $I_c$ is the control current.

Assuming that the phase voltages and the flux densities are true sinusoids, the output voltages of the Hall effect devices are given by:

$$V_{H1} = [\gamma_1 B_M K_v/R_1] \, \omega \sin^2 \theta$$

$$V_{H2} = [\gamma_2 B_M K_v/R_2] \, \omega \cos^2 \theta \quad \text{where}$$

$B_M$ is the maximum flux density,
$K_v$ is the generator sensitivity in peak volts per radian per second,
$\omega$ is the shaft speed in radians per second, and
$\theta$ is the shaft angle in electrical degrees.

Thus the output voltages of the Hall devices under the assumed circumstances are equal to a constant, multiplied by rotor speed and the square of a trigonometric function. The constant in each equation, however, is a function of the appropriate circuit resistance. Therefore, the magnitudes of the output voltages may be balanced by adjusting the circuit resistances, whereupon the constants in the two equations may be replaced by a single constant $K_o$. The Hall device output voltages may then be represented by:

$$V_{H1} = K_o \, \omega \sin^2 \theta$$

$$V_{H2} = K_o \, \omega \cos^2 \theta$$

The sum of the voltages is given by:
$$V_o = V_{H1} + V_{H2} = K_o \, \omega \, (\sin^2 \theta + \cos^2 \theta) = K_o \omega$$

Thus, under the assumed circumstances, the combined output signal is a d.c. voltage proportional to the speed of the rotation of the shaft 11.

It will be remembered that the foregoing relationships were based upon the assumption that the phase voltages and flux densities in the cores were true sinusoids. Any deviation from sinusoidal waveshape in the field will result in high ripple voltages. Normally, these high ripple voltages contain a large third harmonic component and a significantly smaller fifth harmonic component.

According to the principles of the present invention, the harmonic content normally present in such devices can be minimized by proportioning the magnetic circuit in a fashion that causes rejection of the harmonic components ordinarily encountered.

The concept underlying the present invention can best be understood by referring to the diagram of FIG. 3 in which a typical flux distribution together with a magnetic core element have been transformed into a rectangular coordinate representation for purposes of explanation.

In FIG. 3, magnetic flux density corresponding to a fundamental, a third harmonic, and a resultant wave have been plotted against an angle $\theta$. As indicated in FIG. 3, the pole pitch (i.e. 360 electrical degrees) of the third harmonic is equal to 120 physical degrees. In general, the pole pitch of the $n^{th}$ harmonic is equal to $1/n$ physical degrees.

The rectangularly transformed representation of a magnetic core member has been shown adjacent the waveshapes for purposes of illustration. The portion of the flux circulating through the magnetic core element, and therefore through the Hall device, will be proportional to the area under the pole face. For a core element of given thickness, therefore, this flux will be proportional to the pole arc A. As shown in FIG. 3, the pole arc has been selected to be equal to the pole pitch of the third harmonic. Under these conditions, the flux in the core element will contain equal positive and negative third harmonic components so as to force complete cancellation of the harmonic. Under these conditions, the Hall device will be exposed only to the fundamental wave. Thus, assuming that the control current is a sinusoid, the output voltage will also be a pure sinusoid.

Referring again to FIG. 3, it can be seen that in general, a specific odd harmonic can be substantially eliminated by selecting the pole arc so that the pole piece intercepts an even number of half waves of the harmonic to be rejected. This occurs when the pole arc is selected to be a pole pitch of the particular harmonic. Specifically, for the third harmonic rejection pictured in FIG. 3, the pole arc would be selected to be 120° when referred to the fundamental wave. Similarly, if the fifth harmonic were to be eliminated, a pole arc of 72° or 144° could be utilized.

Since the $n^{th}$ harmonic is determined by the net value of the flux corresponding to that harmonic which enters the pole piece, the reduction in the nominal value of the $n^{th}$ harmonic can be expressed mathematically by integrating the $n^{th}$ harmonic over the pole arc:

$$R_n = \int_0^A \sin n\theta \, d\theta$$

where $R_n$ is the fraction to which the nominal $n^{th}$ harmonic is reduced; $A$ is the pole arc in physical degrees; and $\theta$ is given in physical degrees.

Stated conversely, the $n^{th}$ harmonic may be reduced to a specified fraction of a nominal value by selecting a pole arc such that the integral of the $n^{th}$ harmonic over that pole arc is equal to the specified fraction.

From the foregoing relationship, it can be shown that a pole arc of 120° not only rejects the third harmonic, but also reduces any fifth harmonic to 37.3 percent of its nominal value. Since the third harmonic is ordinarily dominant, and the fifth and higher order harmonics relatively insignificant, a pole arc of 120° ordinarily serves to provide a substantially pure sinusoid for practical purposes.

Figure 4:
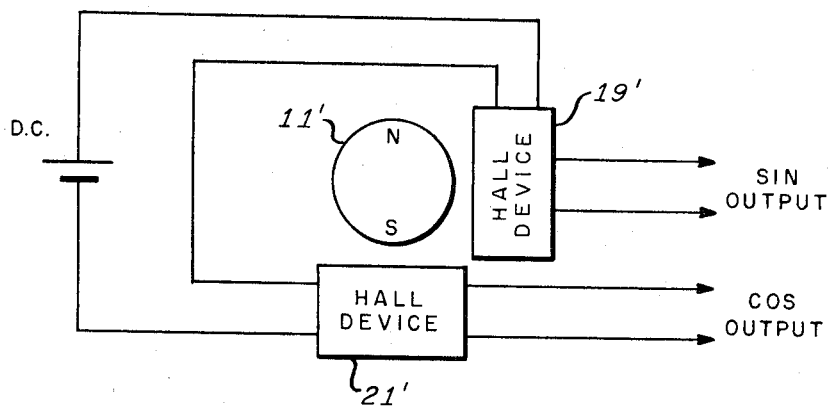
FIG. 4 is a schematic diagram of a resolver circuit employing the principles of the invention.

FIG. 4 illustrates a circuit in which the principles of the invention have been applied to a resolver circuit. In such a circuit, the Hall devices 19' and 21' would be coupled to the shaft 11' and oriented in space quadrature with respect to each other in the same manner as was described for the tachometer embodiment. For the resolver application, however, the Hall devices are energized from a d.c. source so that the generator 13 is not required. Angular displacements imparted to the shaft 11' by external means cause changes in the output signals from the Hall devices. The output signals from the Hall devices 19' and 21' represent sine and cosine functions, respectively, of the north-south magnetic axis of the shaft 11 with respect to a selected reference. The magnetic core elements in the resolver embodiment, of course, are proportioned according to the principles described with respect to the tachometer embodiment of the invention.

Although the foregoing discussion has concerned devices using two-phase stator elements, it will be appreciated that the principles of the invention may be applied to structures using any number of phases if desired.

In general, an m-phase device would utilize $m$ magnetic core elements positioned so that adjacent pole pieces are spaced at equiangular intervals around the rotating shaft and the phase of the flux in any magnetic core element is displaced $180/m$ degrees from the flux in an adjacent core element.

It will be understood that the mechanical arrangement of components illustrated in the previous discussion is intended to be merely illustrative. Thus, for instance, the various embodiments have been described as utilizing a single rotatable shaft. It will be obvious that in some instances it may be preferable to use individual shafts for each magnetic core element and for the generator in the case of a tachometer embodiment. In this arrangement, the individual shafts can be mechanically connected so as to rotate as a unit.

In situations where individual rotatable shafts are used, it may be convenient to align magnetic core stator elements and position the individual shafts so that their magnetic fields are in space quadrature. The ultimate consideration, of course, being that the Hall device output voltages sjould be in phase quadrature.

In a particular tachometer built in accordance with the principles of the invention, a single 44 pole rotor was used for the Hall devices and the generator. The generator was made as a four-phase 180° segment and two Hall circuits were used for the sine phase and two for the cosine phase. The use of two Hall circuits not only increased the voltage level available but also minimized the low frequency variations in the output voltage due to rotor eccentricity and variations in magnitude of the permanent magnet poles.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A rotary transducer in which the $n^{th}$ harmonic is reduced to a specified fraction of its nominal value, said transducer comprising rotor and stator means, said rotor means including diametrically magnetized circular shaft means rotatable about a longitudinal axis, said stator means including a plurality of $m$ closed loop magnetic core means magnetically coupled to said shaft means, each of said core means including a pair of magnetic pole pieces arranged diametrically across said shaft means and connected by a single return path so that substantially all of the flux entering one pole piece in a given pair flows through the same return path and the other pole piece in that pair, each of said pole pieces further having arcuate surfaces forming substantially uniform air gaps with respect to said shaft means whereby a magnetic flux is established in each core means as a function of the instantaneous rotary position of the magnetic field in said shaft means, individual ones of said core means being respectively oriented so that the phase of the varying magnetic flux in one core means is displaced $180/m$ degrees with respect to the phase of the flux in an adjacent core means as the shaft means is rotated, each of said magnetic pole pieces extending through a pole arc such that the integral over the pole arc of the flux corresponding to the $n^{th}$ harmonic is numerically equal to the specified fraction of the nominal value of said $n^{th}$ harmonic, Hall effect sensing means mounted in each of said core means so as to respond to the instantaneous magnitude of the flux in the respective core means, means to supply control currents to said sensing means, and means to connect output signals from said sensing means to exterior utilization apparatus.

2. The transducer of claim 1 wherein said stator means includes two magnetic core means respectively oriented so that the flux in one core means varies in phase quadrature with respect to the flux in the other core means.

3. The transducer of claim 1 wherein each of the pole pieces extends through a pole arc of 120°.

4. The transducer of claim 1 wherein each of the pole pieces extends through a pole arc of 72°.

5. Rotary transducing apparatus for providing output signals substantially free of an $n^{th}$ harmonic component, said transducers comprising a rotor and a stator, said rotor including a diametrically magnetized elongated circular shaft rotatable about its longitudinal axis in response to externally applied torques, said stator including a plurality of m closed loop magnetic core elements, each of said core elements consisting of a single flux path magnetically coupled to said shaft through a pair of diametrically opposed arcuate pole pieces whereby magnetic flux is established in said core elements as a function of the angular displacement of the permanent magnetic field in said shaft, said arcuate pole pieces being shaped to provide substantially uniform air gaps with respect to the surface of said shaft and extending through a pole arc equal to the pole pitch of said $n^{th}$ harmonic component, said core elements being oriented so that adjacent pole pieces are spaced at equiangular intervals around said shaft, each of said core elements including additional air gap means remote from said shaft and arranged so that substantially all of the flux coupled into said core element from said shaft traverses said additional air gap means, each of said core elements further including a Hall effect sensing means supported in said remote air gap means so as to respond to the instantaneous value of the magnetic flux flowing in the respective core element, means to apply a control current to said sensing means, and means to couple output signals from said sensing means to external utilization apparatus.

6. The transducing apparatus of claim 5 wherein said stator includes two closed loop magnetic core elements oriented in space quadrature with respect to each other.

7. The apparatus of claim 5 in which the externally applied torque provides continuous rotation of said shaft and said external utilization apparatus is adapted to indicate the speed of said continuous rotation, and in which said means to apply a control current to said sensing means is an m-phase generator actuated in response to the diametrical magnetization of said shaft, each phase of said generator being coupled to the sensing means in different core elements, said transducer being further characterized in that the output signals from the sensing means in the two core elements are applied in series aiding relationship to said external utilization means.

8. The apparatus of claim 5 in which said means to apply a control current to said sensing means is a source of direct current and in which the means to provide output signals includes means to provide individual output signals from the sensing means in each of said core elements.

9. A tachometer for providing an output voltage substantially free from an $n^{th}$ harmonic component, said tachometer comprising an elongated circular shaft rotatable about a longitudinal axis in response to an externally applied torque, said circular shaft being permanently magnetized so as to provide a north-south magnetic axis along one diameter of said shaft, a plurality of m closed loop magnetic core elements, each of said core elements consisting of a single flux path magnetically coupled to said shaft through a pair of diametrically opposed pole pieces whereby magnetic flux is established in each of said core elements as a function of the angular displacement of said north-south magnetic axis, said pole pieces including arcuate surfaces adjacent the shaft, said arcuate surfaces having a radius centered on said longitudinal axis and a pole arc equal to the pole pitch of said $n^{th}$ harmonic component, said core elements being oriented so that adjacent pole pieces are spaced at equiangular intervals around said shaft, each of said core elements including an air gap remote from said pole pieces and arranged so that substantially all of the flux coupled into said core element from said shaft traverses said remote air gap, individual Hall effect sensing means inserted in each of said air gaps so as to respond to the magnetic flux in the respective core elements, each of said Hall effect sensing means including control current input terminals and a pair of output terminals, m-phase generating means magnetically coupled to said shaft for supplying polyphase sinusoidal voltages in synchronism with the rotation of said shaft, means for applying different ones of said sinusoidal voltages to the control current terminals of the Hall effect sensing means in each of the core elements, means to connect the output terminals of the sensing means in the individual core elements in series aiding relationship so as to provide a combined output voltage equal to the sum of the voltages developed across the individual sensing means.

10. A resolver for providing sinusoidal output voltages substantially free from an $n^{th}$ harmonic component, said resolver comprising an elongated circular shaft rotatable about a longitudinal axis in response to an externally applied torque, said circular shaft being permanently magnetized so as to provide a north-south magnetic axis along one diameter of said shaft, first and second closed loop magnetic core elements, each of said magnetic core elements consisting of a single flux path magnetically coupled to said shaft through diametrically opposed pole pieces whereby magnetic flux is established in each of said core elements as a function of the angular displacement of said north-south magnetic axis, said pole pieces including arcuate surfaces adjacent the shaft, said arcuate surfaces having a radius centered on said longitudinal axis and a pole arc equal to the pole pitch of said $n^{th}$ harmonic component, said first and second core elements being oriented in space quadrature with respect to each other, each of said core elements including an air gap remote from said pole pieces and arranged so that substantially all of the flux coupled into said core element from said shaft traverses said remote air gap, individual Hall effect sensing means inserted in each of said air gaps so as to respond to the magnetic flux in the respective core elements, each of said Hall effect sensing means including control current input terminals and a pair of output terminals, a source of direct current coupled to the input terminals of each of said sensing means, and means for connecting the output terminals of the sensing means in each core element to individual indicating means.

* * * * *